US010775234B2

(12) United States Patent
Oh et al.

(10) Patent No.: US 10,775,234 B2
(45) Date of Patent: Sep. 15, 2020

(54) ELECTRONICS DEVICE INCLUDING OPTICAL SENSOR MODULE HAVING SHIELD PRINTED LAYERS USING A COLORING MATERIAL

(71) Applicant: Samsung Electronics Co., Ltd., Gyeonggi-do (KR)

(72) Inventors: Seungtaek Oh, Seoul (KR); Namsu Kim, Seoul (KR); Myunggon Kim, Gyeonggi-do (KR); Seohyun Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 156 days.

(21) Appl. No.: 15/915,835

(22) Filed: Mar. 8, 2018

(65) Prior Publication Data

US 2018/0259388 A1  Sep. 13, 2018

(30) Foreign Application Priority Data

Mar. 8, 2017  (KR) .................. 10-2017-0029415

(51) Int. Cl.
*G01J 1/04* (2006.01)
*H04M 1/02* (2006.01)
(Continued)

(52) U.S. Cl.
CPC .............. *G01J 1/0437* (2013.01); *G01J 1/08* (2013.01); *G01J 1/44* (2013.01); *G06F 1/1637* (2013.01);
(Continued)

(58) Field of Classification Search
CPC ... G01J 1/0437; G01J 1/08; G01J 1/44; G06F 1/1637; H04M 1/026; H04M 1/0266; H04M 2250/12; H04M 1/0202
(Continued)

(56) References Cited

U.S. PATENT DOCUMENTS 8,912,480 B2 * 12/2014 Pope ..................... G01J 1/0422
250/221
9,525,093 B2  12/2016 Costello et al.
(Continued)

FOREIGN PATENT DOCUMENTS

CN  101881657  11/2010
CN  102967362  3/2013
(Continued)

OTHER PUBLICATIONS

Ahmet Gurses et al: "Dyes and Pigments: Their Structure and Properties", In: Essential Oils as Reagents in Green Chemistry, Chapter 2, XP055489416, Dec. 31, 2016, 18 Pgs.
(Continued)

*Primary Examiner* — Que Tan Le
(74) *Attorney, Agent, or Firm* — The Farrell Law Firm, P.C.

(57) ABSTRACT

An electronic device is disclosed and includes an optical sensor module, a window, a first shield-printed layer, and a second shield-printed layer. The optical sensor module includes a first optical sensor and a second optical sensor. The window covers the optical sensor module. The first shield-printed layer is printed in a first region for transmitting a sensor light from the first optical sensor on a lower surface of the window facing the optical sensor module. The second shield-printed layer is printed in a second region for transmitting a sensor light from the second optical sensor on the lower surface of the window. The first and second shield-printed layers are printed using a same coloring material.

11 Claims, 13 Drawing Sheets

(51) Int. Cl.
*G06F 1/16* (2006.01)
*G01J 1/08* (2006.01)
*G01J 1/44* (2006.01)

(52) U.S. Cl.
CPC ........ *H04M 1/0266* (2013.01); *H04M 1/0202* (2013.01); *H04M 1/026* (2013.01); *H04M 1/0283* (2013.01); *H04M 2250/12* (2013.01)

(58) Field of Classification Search
USPC ........................................ 250/239, 226, 221
See application file for complete search history.

(56) References Cited

U.S. PATENT DOCUMENTS

| | | | |
|---|---|---|---|
| 10,008,545 B2 * | 6/2018 | Lee | ........................ H01L 51/441 |
| 2008/0158173 A1 | 7/2008 | Hamblin et al. | |
| 2010/0282953 A1 | 11/2010 | Tam | |
| 2011/0090420 A1 | 4/2011 | Kim et al. | |
| 2011/0102547 A1 | 5/2011 | Sul et al. | |
| 2012/0170284 A1 | 7/2012 | Shedletsky | |
| 2013/0048837 A1 | 2/2013 | Pope et al. | |
| 2013/0292706 A1 | 11/2013 | Costello et al. | |
| 2014/0127442 A1 | 5/2014 | Ryu et al. | |
| 2015/0378207 A1 | 12/2015 | Kim et al. | |
| 2016/0327689 A1 | 11/2016 | Sasaki et al. | |

FOREIGN PATENT DOCUMENTS

| | | |
|---|---|---|
| CN | 105301824 | 2/2016 |
| CN | 106328666 | 1/2017 |
| EP | 3 059 660 | 8/2016 |
| JP | 2013-205665 | 10/2013 |
| KR | 20100033278 | 3/2010 |
| KR | 20100069436 | 6/2010 |
| KR | 20110049002 | 5/2011 |

OTHER PUBLICATIONS

International Search Report dated May 8, 2018 issued in counterpart application No. PCT/KR2018/002710, 3 pages.
European Search Report dated Jul. 10, 2018 issued in counterpart application No. 18160684.9-1216, 1216, 10 pages.
Chinese Office Action dated Mar. 19, 2020 issued in counterpart application No. 201810183972.7, 22 pages.

* cited by examiner

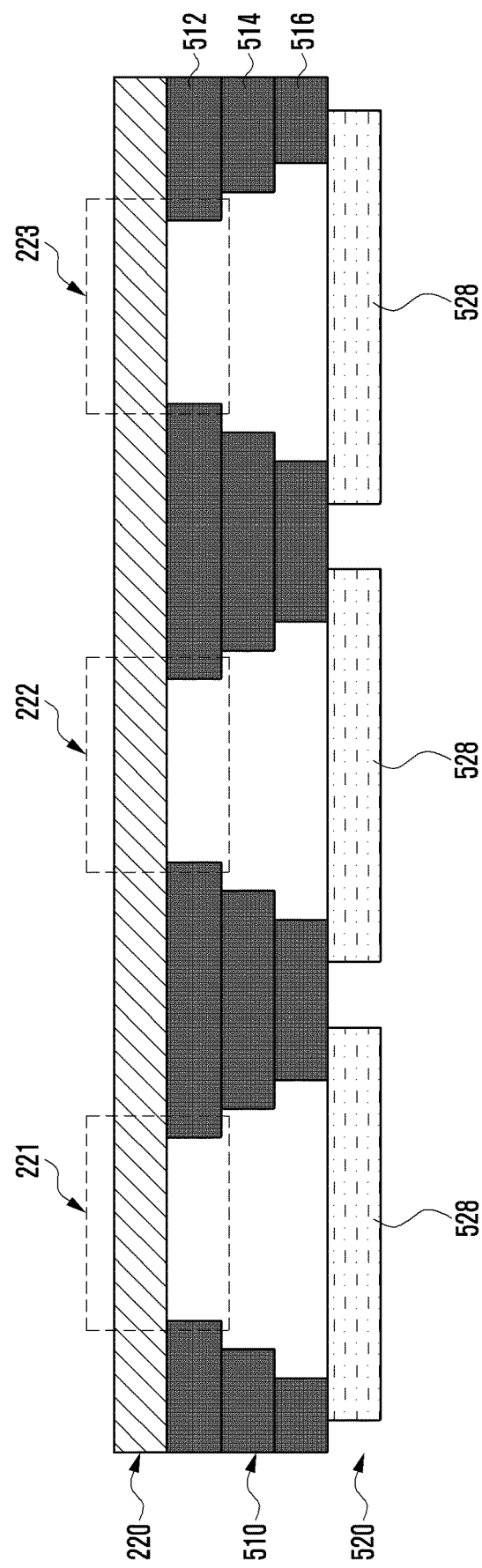

ELECTRONICS DEVICE INCLUDING OPTICAL SENSOR MODULE HAVING SHIELD PRINTED LAYERS USING A COLORING MATERIAL

CROSS-REFERENCE TO RELATED APPLICATION(S)

This application is based on and claims priority under 35 U.S.C. § 119 to Korean Patent Application No. 10-2017-0029415, filed on Mar. 8, 2017, in the Korean Intellectual Property Office, the disclosure of which is incorporated by reference herein in its entirety.

BACKGROUND

1. Field of the Disclosure

The present disclosure relates generally to an electronic device, and more particularly, to an electronic device including a sensor and method for manufacturing the same.

2. Description of the Related Art

Electronic devices perform a variety of functions in a complex manner. For example, a mobile communication terminal, a personal digital assistant (PDA), an electronic organizer, a smart phone, and a tablet personal computer (PC), provide users with enhanced convenience while realizing advanced performance.

The electronic device may use a sensor to collect information related to the electronic device itself, surroundings of the electronic device, and/or a user. The electronic device may include one or more sensors and provide various services based on information collected through such sensors.

An aesthetic sense felt by the user may be deteriorated if any sensor is exposed outside of the electronic device. For example, in the case of an electronic device having an optical sensor module, a portion of the optical sensor module may be exposed to collect information. In this case, in order to shield the optical sensor module from having an exposed appearance, a printed layer may be formed on a lower surface of a window covering the optical sensor module by using a material having a low transmissivity in the visible light region and a high transmissivity in a certain wavelength region corresponding to each sensor light. However, for shielding a plurality of optical sensors, a plurality of printing processes should be repeated using coloring materials corresponding to the sensor light characteristics of the respective optical sensors.

SUMMARY

The present disclosure has been made to address at least the above-discussed mentioned problems and/or disadvantages and to provide at least the advantages described below.

Accordingly, an aspect of the present disclosure is to provide an electronic device using a coloring material capable of shielding two or more sensors.

An aspect of the present disclosure provides, by using a coloring material capable of effectively shielding different types of two or more optical sensors, a plurality of printing processes may not be repeated.

An aspect of the present disclosure, by simultaneously shielding a plurality of sensors separately disposed in the electronic device through a coloring material that implements the same color as a black matrix (BM) region, provides an electronic device which provides an aesthetic consistency to a user.

According to an aspect of the present disclosure, an electronic device includes an optical sensor module including a first optical sensor and a second optical sensor; a window covering the optical sensor module; a first shield-printed layer printed in a first region for transmitting a sensor light from the first optical sensor on a lower surface of the window facing the optical sensor module; and a second shield-printed layer printed in a second region for transmitting a sensor light from the second optical sensor on the lower surface of the window. The first and second shield-printed layers may be printed using a same coloring material.

In accordance with an aspect of the present disclosure, an electronic device includes an optical sensor module including a first optical sensor and a second optical sensor; a light emitting diode (LED) module disposed near the optical sensor module; a window covering both the optical sensor module and the LED module; a first shield-printed layer printed in a first region for transmitting a sensor light from the first optical sensor on a lower surface of the window facing both the optical sensor module and the LED module; a second shield-printed layer printed in a second region for transmitting a sensor light from the second optical sensor on the lower surface of the window; and a third shield-printed layer printed in a third region for transmitting an LED light from the LED module on the lower surface of the window. The first, second and third shield-printed layers may be printed using the same coloring material.

In accordance with an aspect of the present disclosure, a method for manufacturing a window of an electronic device including a display, an optical sensor module having first and second optical sensors, and the window covering both the optical sensor module and the display includes performing a base printing by coating a first ink on at least a part of a non-display area of the window, wherein the non-display area is an area disallowing transmission of an image displayed on the display; performing shield printing by coating a second ink on at least a part of the non-display area coated with the first ink for the base printing; performing an adhesion-enhancement printing by coating a third ink on at least a part of the non-display area coated with the second ink for the shield printing; and performing a sensor-shield printing by coating a fourth ink on a first region and a second region of the non-display area, wherein the first region is a region for transmitting a sensor light from the first optical sensor and the second region is a region for transmitting a sensor light from the second optical sensor. The non-display area coated with the first ink may be at least a part of a remaining area other than the first and second regions.

BRIEF DESCRIPTION OF THE DRAWINGS

The above and other aspects, features, and advantages of the present disclosure will be more apparent from the following description taken in conjunction with the accompanying drawings, in which:

FIGS. 5A and 5B are diagrams of a window including an opaque printed layer and the shield-printed layer, according to an embodiment of the present disclosure;

DETAILED DESCRIPTION

Figure 1:
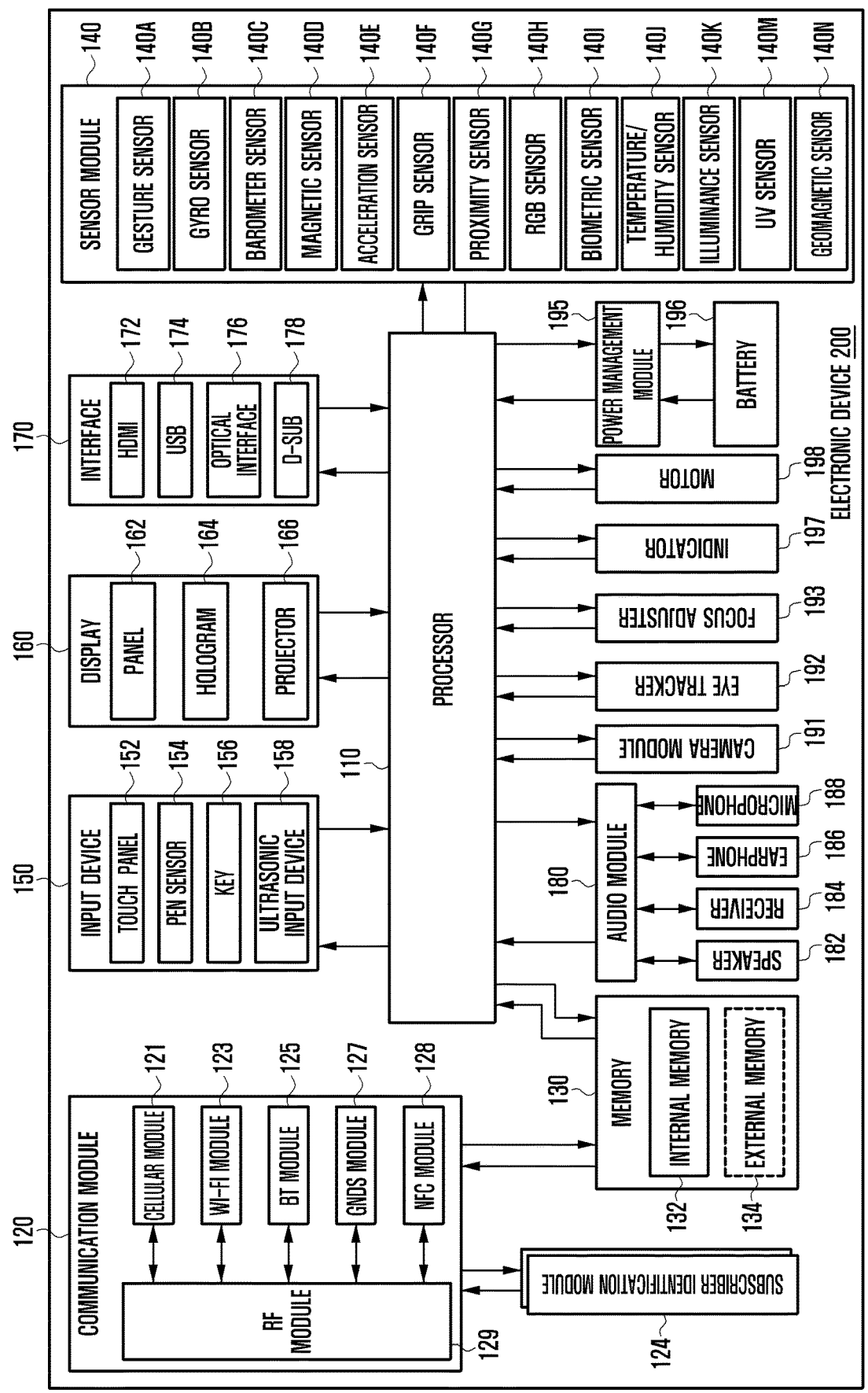
FIG. 1 is a block diagram of an electronic device, according to an embodiment of the present disclosure.

Embodiments of the present disclosure are described in detail with reference to the accompanying drawings, in which similar reference numerals may be used to refer to similar elements. Those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the dictionary meanings, but, are may be used by the inventor to enable a clear and consistent understanding of the present disclosure. Embodiments described herein may be provided for illustration purposes only and not for limiting the present disclosure as defined by the appended claims and their equivalents.

The singular forms "a," "an," and "the" include all possible combinations of the listed items unless the context clearly indicates otherwise. Thus, for example, reference to "a component surface" includes reference to one or more of such surfaces.

In the present disclosure, the expressions "A or B", "at least one of A and/or B", and "one or more of A and B" may include all possible combinations of A and B. Expressions including ordinal numbers, such as "first" and "second," may modify various elements. However, the above expressions do not limit the sequence and/or importance of the elements and are used merely for the purpose to distinguish an element from the other elements. In case where a certain (e.g., the first) element is referred to as being "connected" or "accessed" to another (e.g., the second) element, it should be understood that the element is connected or accessed directly to the other element or through another (e.g., the third) element. In contrast, when an element (e.g., the first) is referred to as being "directly coupled" or "directly connected" to another element (e.g., the second), it should be understood that there are no intervening element (e.g., the third).

The expression "configured to" may be used interchangeably with the expressions, "adapted to", "having the ability to", "modified to", "made to", "capable of", or "designed to". In some situations, the expression "device configured to" may mean that the device may operate with other device(s) or other component(s). For example, the expression "processor configured to perform A, B and C" may mean a dedicated or embedded processor for performing the above operations, or a central processing unit (CPU), or an application processor (AP), capable of performing the above operations by executing one or more software programs stored in a memory device.

An electronic device according to an embodiment of the present disclosure may include at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer 3 (MP3) player, a medical device, a camera, and a wearable device. The wearable device may include at least one of an accessory type (e.g., a watch, a ring, a bracelet, an anklet, a necklace, an electronic accessory, eyeglasses, contact lenses, or a head-mounted device (HMD)), a fabric or cloth embedded type (e.g., electronic clothing), a body attachable type (e.g., a skin pad or a tattoo), and a body transplant circuit.

An electronic device may include at least one of a television (TV), a digital versatile disc (DVD) player, an audio device, a refrigerator, an air-conditioner, a vacuum cleaner, an oven, a microwave, a washing machine, an air cleaner, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, and an electronic frame.

An electronic device may include at least one of a medical device (e.g., magnetic resonance angiography (MRA) device, magnetic resonance imaging (MRI) device, computed tomography (CT) device, a scanning machine, an ultrasonic wave device), a navigation device, a global navigation satellite system (GNSS), an event data recorder (EDR), a flight data recorder (FDR), a vehicle infotainment device, electronic equipment for a ship (e.g., navigation equipment for a ship or gyrocompass), an avionics device, a security device, a head unit or a device for a vehicle, an industrial or home robot, a drone, an automated teller machine (ATM), a point of sales (POS) device, and an Internet of things (IoT) device (e.g., a lamp, a sensor, a sprinkler, a fire alarm, a thermostat, a street light, a toaster, athletic equipment, a hot water tank, a heater or a boiler).

An electronic device may include at least one of furniture, a portion of a building/structure, a car, an electronic board, an electronic signature receiving device, a projector, and a measuring device (e.g., a water meter, an electric meter, a gas meter, a wave meter, etc.).

An electronic device may be flexible or a combination of two or more of the aforementioned devices. An electronic device according to embodiments of the present disclosure is not limited to the aforementioned devices and may be a newly developed electronic device.

In the present disclosure, the term "user" may refer to a person who uses an electronic device, or a machine (e.g., an artificial intelligence electronic device) which uses an electronic device.

FIG. 1 is a block diagram of an electronic device, according to an embodiment of the present disclosure. The electronic device 200 may include one or more processors (e.g., APs) 110, a communication module 120, a subscriber identification module (SIM) card 124, a memory 130, a sensor module 140, an input module 150, a display module 160, an interface 170, an audio module 180, a camera module 191, an eye tracker 192, a focus adjuster 193, a power management module 195, a battery 196, an indicator 197, and a motor 198.

The processor 110 may execute an operating system (OS) or an application program, thereby controlling multiple hardware or software elements connected to the processor 110 and performing data processing and arithmetic operations. The processor 110 may be implemented by, for example, a system on chip (SoC), and include a graphical processing unit (GPU) and/or an image signal processor. The processor 110 may also include at least a part (e.g., a cellular module 121) of the elements shown in FIG. 1. The processor 110 may load instructions or data, received from at least one of the other elements (e.g., a nonvolatile memory), into a volatile memory, process them, and store various data in the nonvolatile memory.

The communication module 120 includes a cellular module 121, a Wi-Fi module 123, a bluetooth (BT) module 125, a global positioning system (GPS) module 127, a near field communication (NFC) module 128, and a radio frequency (RF) module 129.

The cellular module 121 may provide a voice call, a video call, a message service, or an internet service over a communication network. The cellular module 121 may perform the identification and authentication of the electronic device 200 in the communication network by utilizing the SIM card 124. The cellular module 121 may perform at least some of functions provided by the processor 110, and may include a communication processor (CP).

Each of the Wi-Fi module 123, the BT module 125, the GPS module 127 and the NFC module 128 may include a processor for processing data transmitted and received. Two or more of the cellular module 121, the Wi-Fi module 123, the BT module 125, the GPS module 127 and the NFC module 128 may be included in a single integrated chip (IC).

The RF module 129 may transmit and receive an RF signal. The RF module 129 may include a transceiver, a power amplifier module (PAM), a frequency filter, a low noise amplifier (LNA), or an antenna. At least one of the cellular module 121, the Wi-Fi module 123, the BT module 125, the GPS module 127 and the NFC module 128 may transmit and receive an RF signal through a separate RF module.

The SIM 124 may be a SIM card or an embedded SIM, and may include unique identification information (e.g., integrated circuit card identifier (ICCID)) or subscriber information (e.g., international mobile subscriber identity (IMSI)).

The memory 130 includes an internal memory 132 or an external memory 134. The internal memory 132 may include at least one of a volatile memory (e.g., a dynamic random access memory (DRAM), a static RAM (SRAM), or a synchronous DRAM (SDRAM)), and a nonvolatile memory (e.g., a one-time programmable read-only memory (OTPROM), a programmable ROM (PROM), an erasable and programmable ROM (EPROM), an electrically EPROM (EEPROM), a mask ROM, a flash ROM, a flash memory (e.g., NAND flash or NOR flash), a hard drive, or a solid state drive (SSD)).

The external memory 134 includes a flash drive, such as a compact flash (CF), a secure digital (SD), a micro secure digital (Micro-SD), a mini secure digital (Mini-SD), an extreme digital (xD), a multimedia card (MMC), or a memory stick. The external memory 134 may be functionally and/or physically connected to the electronic device 200 through various interfaces.

The sensor module 140 may measure a physical quantity or detect an operating state of the electronic device 200 and convert the measured or detected information into an electric signal. The sensor module 140 includes, at least one of a gesture sensor 140A, a gyro sensor 140B, an atmospheric pressure sensor 140C, a magnetic sensor 140D, an acceleration sensor 140E, a grip sensor 140F, a proximity sensor 140G, a color sensor (e.g., red, green and blue (RGB) sensor) 140H, a biometric sensor 1401, a temperature/humidity sensor 140J, an illuminance sensor 140K, a ultra violet (UV) sensor 140M, and a geomagnetic sensor 140N. Additionally or alternatively, the sensor module 140 may include an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 140 may further include a control circuit for controlling one or more sensors therein. The electronic device 200 may further include a processor, either as a part of the processor 110 or separately, configured to control the sensor module 140 while the processor 110 is in a sleep state.

The input module 150 includes a touch panel 152, a digital pen sensor 154, a key 156, and/or an ultrasonic input unit 158.

The touch panel 152 may use at least one of a capacitive scheme, a resistive scheme, an IR scheme, and an acoustic wave scheme. Also, the touch panel 152 may further include a control circuit and/or a tactile layer to provide a tactile response to a user.

The digital pen sensor 154 may be a part of a touch panel or include a separate recognition sheet.

The key 156 may include a physical button, an optical key, or a keypad. The ultrasonic input unit 158 may detect ultrasonic waves generated from an input tool by using a microphone 188 and then identify data corresponding to the detected ultrasonic waves.

The display module 160 includes a panel 162, a hologram 164, and/or a projector 166. The display module 160 may be implemented to be flexible, transparent, or wearable. The panel 162 may be formed as a single module together with the touch panel 152. The hologram 164 may display a three-dimensional image in the air by using interference of light. The projector 166 may display an image by projecting light onto a screen. The screen may be located inside or outside the electronic device 200. The display module 160 may further include a control circuit for controlling the panel 162, the hologram 164, and/or the projector 166.

The interface 170 may include a high definition multimedia interface (HDMI) 172, a universal serial bus (USB) interface 174, an optical interface 176, a d-subminiature (D-SUB) 178, a mobile high-definition link (MHL) interface, a secure digital (SD) card interface, a multi-media card (MMC) interface, and/or an Infrared Data Association (IrDA) standard interface.

The audio module 180 may convert a sound into an electrical signal, and vice versa. The audio module 180 may process sound information inputted or outputted through a speaker 182, a receiver 184, an earphone 186, or the microphone 188.

The camera module 191 may capture a still image or record a video and may include one or more image sensors (e.g., a front sensor and/or a rear sensor), a lens, an image signal processor (ISP), and/or a flash (e.g., LED or a xenon lamp). The eye tracker 192 is a device for measuring eye positions and eye movement. The focus adjuster 193 is a device for adjusting the focus of the lens.

The power management module 195 may manage electrical power of the electronic device 200, and may include a power management integrated circuit (PMIC), a charger integrated circuit (charger IC), and/or a battery gauge. The PMIC may support wired and/or wireless charging type(s).

The wireless charging type may include a magnetic resonance type, a magnetic induction type, or an electromagnetic wave type, and may need an additional circuit such as a coil loop, a resonance circuit, or a rectifier. The battery gauge may measure a charge level, a voltage, a current, and/or a temperature. The battery 196 may be a rechargeable battery and/or a solar battery.

The indicator 197 may indicate a boot status, a message status, or a charging status of the electronic device 200 or a part thereof (e.g., the processor 110). The motor 198 may convert an electric signal into a mechanical vibration to generate a vibration or a haptic effect. The electronic device 200 may include a GPU for supporting a module TV in accordance with a standard such as digital multimedia broadcasting (DMB), digital video broadcasting (DVB), and/or MediaFlo™.

Each of the above-described elements of the electronic device 200 may be formed of one or more of the above-described components, and the name of each element may be varied depending on the type of electronic device.

The electronic device 200 may include at least one of the above-described elements, may omit some of the above-described elements, or may include any additional element. In addition, some of the elements of the electronic device 200 may be combined into a single entity to perform functions identical to individual elements before the combination.

Figure 2:
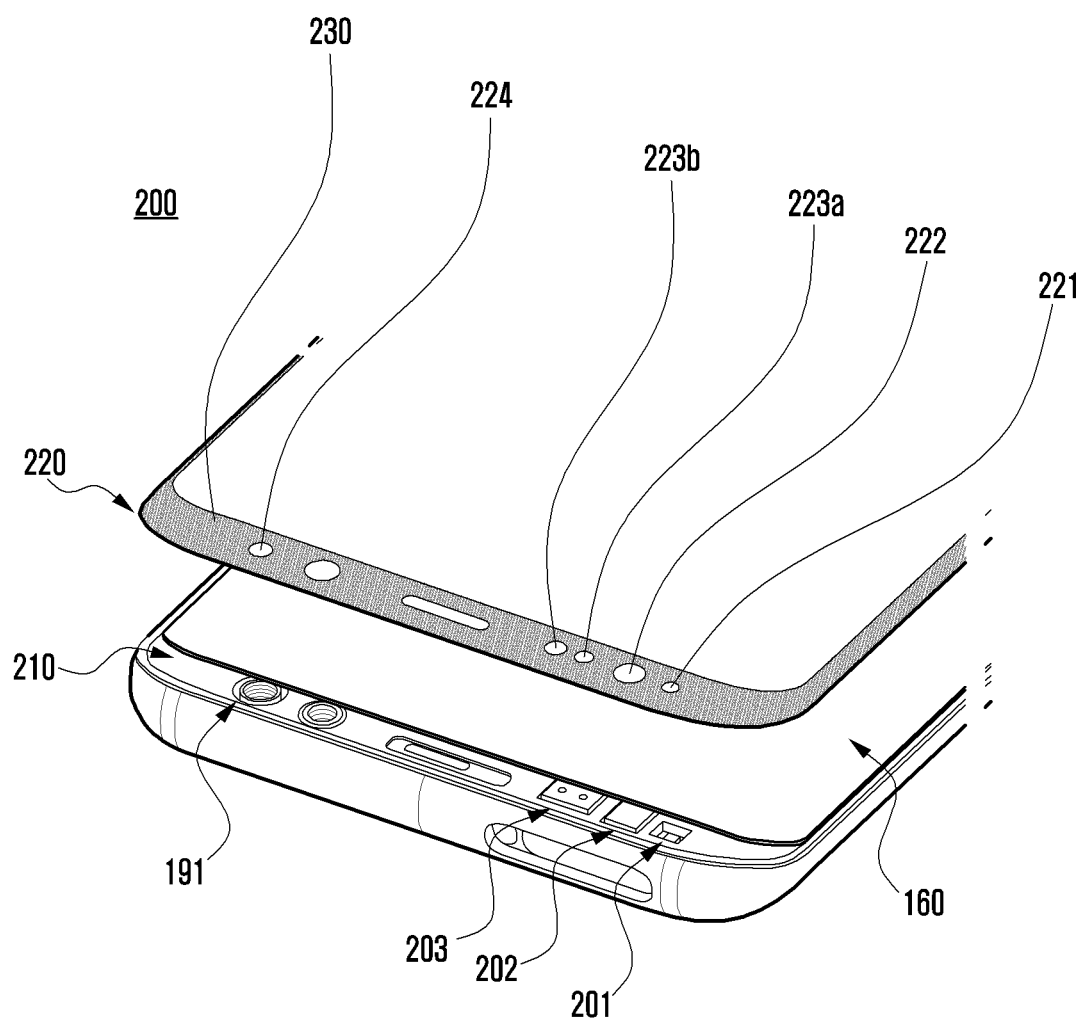
FIG. 2 is a perspective diagram of a configuration of an electronic device, according to an embodiment of the present disclosure.

FIG. 2 is a perspective diagram of a configuration of an electronic device, according to an embodiment of the present disclosure.

The electronic device 200 may include the display 160, the camera module 191, an LED module 201, and a plurality of sensors 202 and 203, all of which may be referred to as device components hereinafter. The electronic device 200 may also include a housing 210 and a window 220. The window 220 covers the housing 210 and the device components. The device components are disposed in the housing 210, and at least a portion of each device component is exposed to the outside.

The electronic device 200 may include an optical sensor module comprising a plurality of sensors 202 and 203 that utilize optical characteristics to collect information related to the electronic device 200, an environment of the electronic device 200, and/or a user.

The plurality of sensors 202 and 203 may be a proximity sensor, an illuminance sensor, and/or an IR sensor. The sensors 202 and 203 may collect information by using a sensor light, such as a facial recognition sensor, an iris recognition sensor, a fingerprint recognition sensor, and a heart rate monitor (HRM) sensor capable of recognizing the user's identity. The electronic device 200 may include at least one of the above-mentioned sensors.

The LED module 201 may indicate an operating state of the electronic device 200 by outputting an LED light to the outside, such as a red, green, or blue color. Also, the LED module 201 may change the color or flashing pattern of the LED light to provide information such as message reception, alarm, or charging status of the electronic device 200.

The electronic device 200 may include the window 220 formed of a transparent material and covering the display 160, the camera module 191, the LED module 201, and the optical sensor module 202 and 203.

At least a portion 230 of the window 220 that corresponds to a region where the display 160, the camera module 191, the LED module 201, and the optical sensor module 202 and 203 are disposed may be printed using a material having an opaque property. The portion 230 of the window 220 may be also referred to as a black matrix (BM) region.

Although FIG. 2 shows that the optical sensor module 202 and 203 and the LED module 201 are located on the side of the display 160, positions and numbers thereof may be varied. For example, the optical sensor module 202 and 203 and/or the LED module 201 may be located on the backside of the electronic device 200.

Figure 3A:
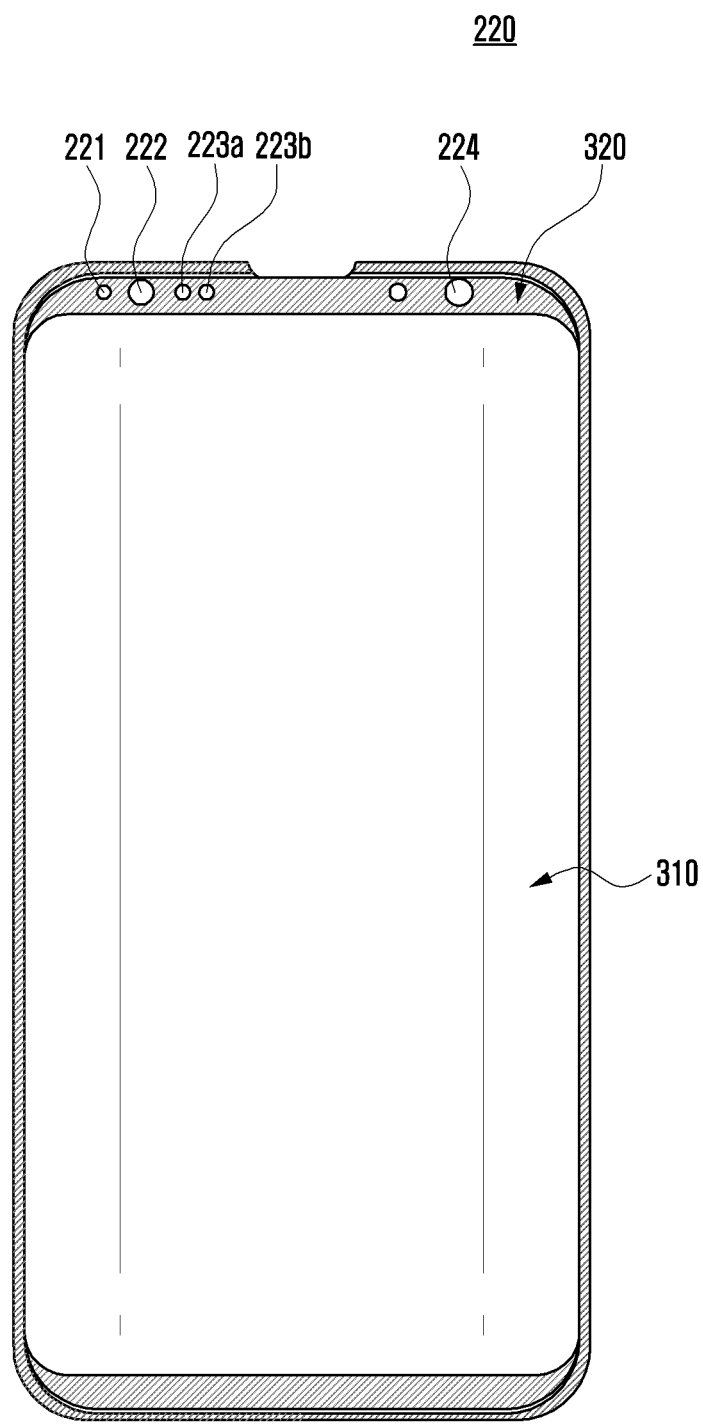
FIGS. 3A and 3B are diagrams illustrating a window equipped in the electronic device, according to an embodiment of the present disclosure.
Figure 3B:
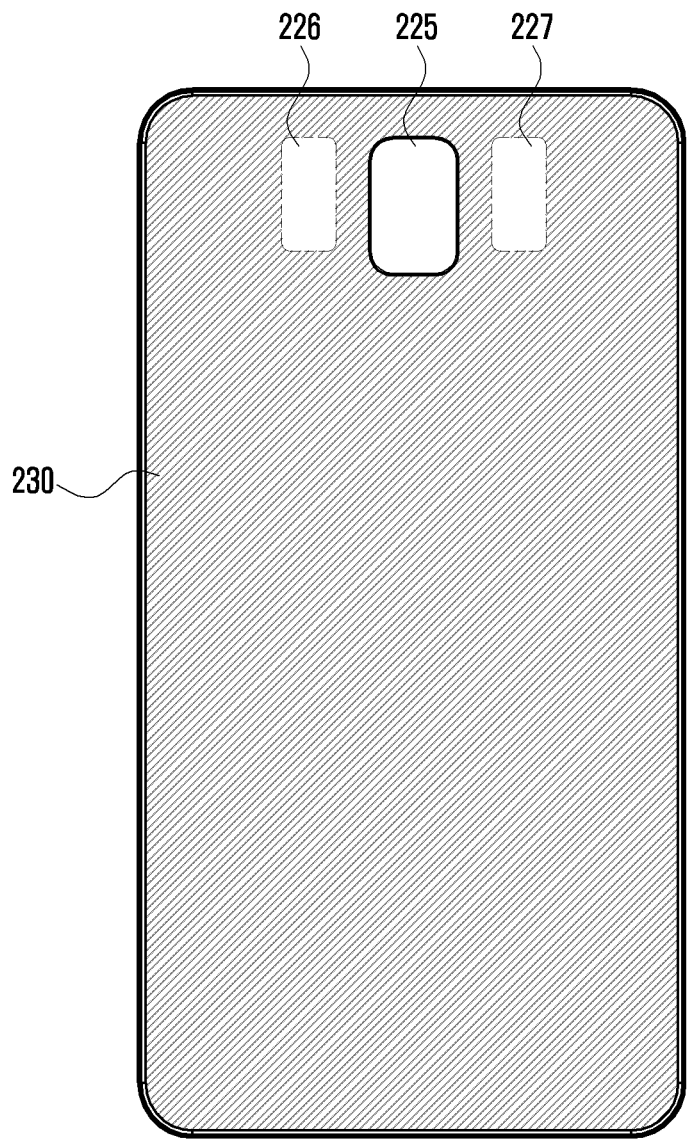

FIGS. 3A and 3B are diagrams of a window equipped in the electronic device, according to an embodiment of the present disclosure.

As shown in FIG. 3A, the window 220 may include a display area 310 (e.g., display 160) and allows an image being displayed on the display 160 to be transmitted.

The window 220 may include a non-display area 320 which is the area remaining except the display area 310.

The non-display area 320 may be printed in a specific opaque color for preventing transmission of light at least in some parts thereof in order to provide a beautiful appearance of the electronic device 200, and also shield the internal components of the electronic device 200.

The non-display area 320 of the window 220 may be printed with an opaque material except for specific regions (e.g., 221, 222, 223*a*, 223*b* and 224).

In the non-display area 320 of the window 220, a region 224 corresponding to the camera module 191, a region 221 corresponding to the LED module 201, and regions 222, 223*a* and 223*b* corresponding to the optical sensor module 202 and 203 may not be printed with an opaque material to output light from each device component or to receive incident light from the outside. Namely, except for regions 221, 222, 223*a*, 223*b* and 224, the non-display area 320 may be printed with an opaque material.

A film having an opaque characteristic may be attached, instead of, or in addition to, printing using the opaque material, to at least parts of the window 220. For example, except for the specific regions 221, 222, 223*a*, 223*b* and 224, a part of the non-display area 320 may be covered with an adhering film having an opaque characteristic, and the other part may be printed with a coloring material having an opaque characteristic. For example, the remainder of the non-display area 320 except for the specific regions 221, 222, 223*a*, 223*b* and 224, may be entirely printed with the coloring material or entirely covered with the adhering film, or at least a part of the remainder may be printed with the coloring material and also covered with the adhering film. In addition, the remainder may be entirely printed with the coloring material and also partially covered with the adhering film. Conversely, the remainder may be entirely covered with the adhering film and also partially printed with the coloring material. If a certain area is printed with the opaque coloring material and further covered with the adhering film, the film may have no opaque characteristic.

FIG. 3B illustrates the window 220 mounted to the rear surface opposite to the front surface having the display 160 of the electronic device 200 according to an embodiment of the present disclosure.

The electronic device 200 may include the camera module 191 and the optical sensor module 202 and 203, the window 220 for covering the device components, and a cover housing for covering the window 220 and having an opening through which at least a part of the window 220 is exposed. Instead of including such a cover housing, the window 220 may cover the entire backside of the electronic device 200. For example, the window 220 may have an integral structure capable of simultaneously covering the camera module 191 and the optical sensor module 202 and 203. Alternatively, the window 220 may have a structure capable of covering only the optical sensor module 202 and 203 including a plurality of sensors separately from the camera module 191.

The optical sensor module 202 and 203 may include a plurality of sensors disposed on the backside of the electronic device 200. The optical sensor module 202 and 203 may be a heart rate monitor (HRM) sensor and/or a fingerprint recognition sensor. The HRM sensor may measure a user's heartbeat or oxygen saturation by irradiating light to a user's blood vessel and sensing the returning light. The fingerprint recognition sensor may obtain user's fingerprint information.

A particular area 230 of the window 220 may be printed in a specific opaque color for disallowing transmission of light to provide a beautiful appearance of the electronic device 200, and also shield the internal components of the electronic device 200. For example, if the electronic device 200 includes the window 220 covering the entire backside thereof without a separate cover housing, the window 220 may be printed with an opaque material for disallowing transmission of light, except for a region 225 corresponding to the camera module and regions 226 and 227 corresponding to the optical sensor module.

A film having an opaque characteristic may be attached to at least a part of the particular area 230 of the window 220, instead of, or in addition to, printing using the opaque material. For example, a part of the particular area 230 may be covered with an adhering film having an opaque characteristic, and another part may be printed with a coloring material having an opaque characteristic. The window 220 may be entirely printed with the coloring material, entirely covered with the adhering film, or at least a part of the window may be printed with the coloring material and also covered with the adhering film.

The window 220 may be entirely printed with the coloring material and also partially covered with the adhering film. Conversely, the window 220 may be entirely covered with the adhering film and also partially printed with the coloring material.

If a certain area is printed with the opaque coloring material and further covered with the adhering film, the film may not have an opaque characteristic.

The printed or film-attached area may be determined to match the location of the camera module and/or the location of the optical sensor module, or may be determined based on the design of the electronic device 200 (e.g., for the purpose of forming a logotype) regardless of the camera module and/or the optical sensor module.

Figure 4A:
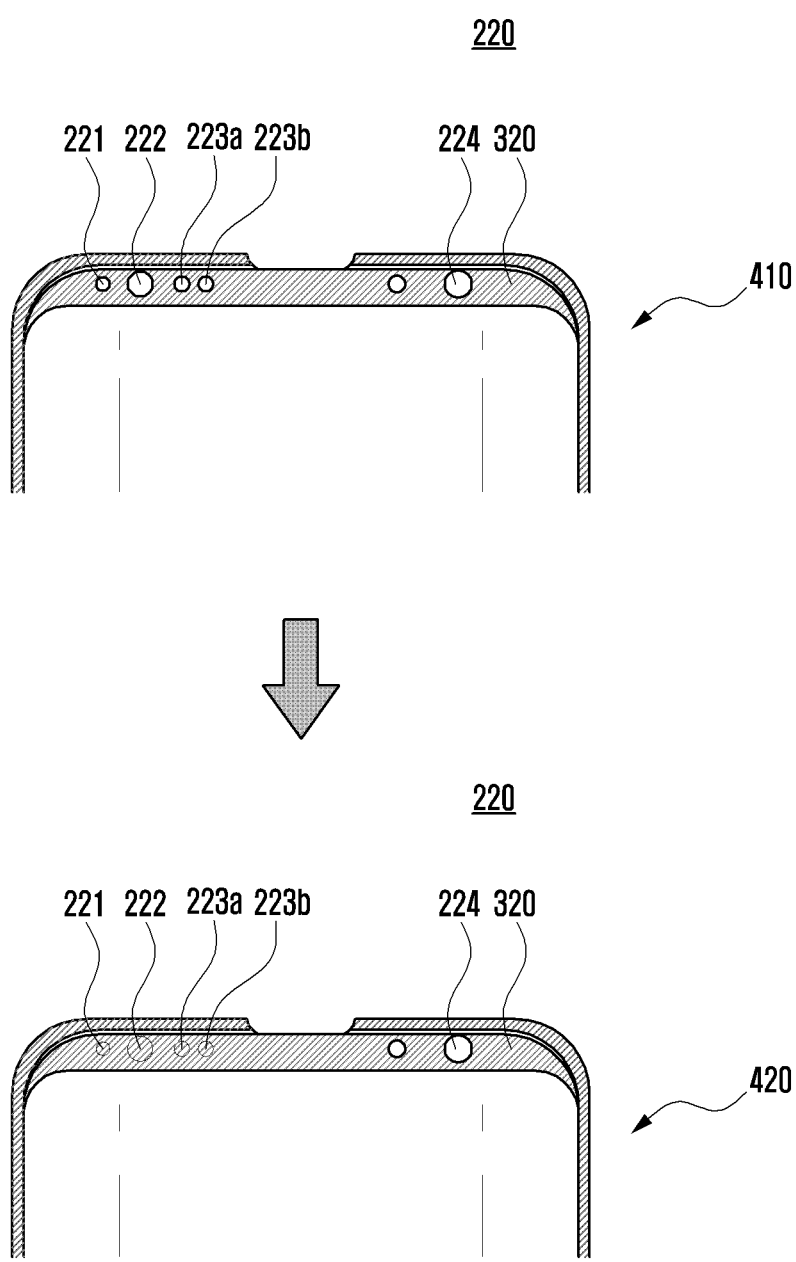
FIGS. 4A and 4B are diagrams of a window having a shield-printed layer for shielding an LED module or an optical sensor module in the electronic device, according to an embodiment of the present disclosure.

FIG. 4A is a diagram of the window having a shield-printed layer for shielding an LED module or an optical sensor module in the electronic device, according to an embodiment of the present disclosure.

A reference numeral 410 indicates the window 220 before a shield-printed layer 520 is formed. Reference numeral 420 indicates the window 220 after the shield-printed layer 520 is formed.

In the window 220, specific regions 221, 222, 223a, 223b and 224 of the non-display area 320 may not be printed with an opaque material to allow the respective device components (e.g., the camera module 191, the LED module 201, and the optical sensor module 202 and 203) to perform their functions. However, if any part of the window 220 is not printed with the opaque material, the internal device components may be exposed through the unprinted regions and the outward beauty of the electronic device 200 may be deteriorated. Among the regions of the non-display area 320, some regions 222, 223a and 223b corresponding to the optical sensor module 202 and 203 may be shield-printed with a material having a low transmissivity for light in the visible wavelength band and a high transmissivity for light in the IR wavelength band using light in the IR wavelength band. This material may include a coloring material that has a dye composition (or, a dye composition and a pigment composition).

Among the regions of the non-display area 320, the region 221 corresponding to the LED module 201 may be shield-printed with the same material as the material printed on the regions 222, 223a and 223b, corresponding to the optical sensor module 202 and 203.

For example, the region 221, corresponding to the LED module 201, may be shield-printed with a material that does not distort the characteristics of the LED light when the LED module 201 outputs the LED light, such as when the LED module is operated, and that shields the LED module 201 such that the LED module 201 is not visible from the outside when the LED module 201 does not output the LED light, when the LED module is not operated.

Among the regions of the non-display area 320, the region 224, corresponding to the camera module 191, that mainly uses the optical characteristics of the visible wavelength band, may not be shield-printed.

When the shield-printed layer 520 is formed on the regions 221, 222, 223a and 223b of the window 220 corresponding to the LED module 201, and the optical sensor module 202 and 203 as indicated by the reference numeral 420, regions 221, 222, 223a and 223b may be integrated in color into the non-display area 320 while preventing the internal components from being visible from the outside. This may provide a beautiful appearance of the electronic device 200. When the shield-printed layer 520 is formed using a coloring material containing a dye composition (or, a dye composition and a pigment composition), the above regions 221, 222, 223a and 223b may be printed with the same material at one time to provide an esthetic consistency in the outward appearance of the electronic device 200, and also reduce a manufacturing cost of the electronic device 200 by omitting process steps.

Figure 4B:
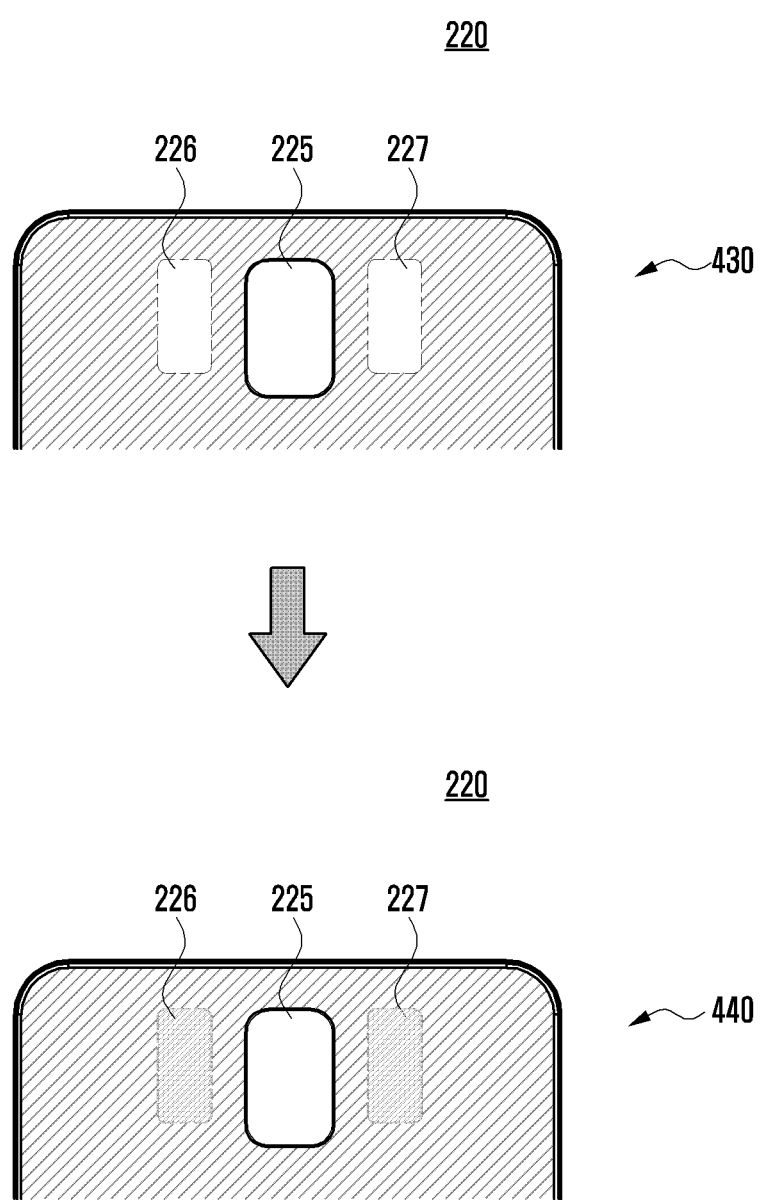

FIG. 4B is a diagram of the window having the shield-printed layer for shielding the optical sensor module on the backside of the electronic device, according to an embodiment of the present disclosure.

A reference numeral 430 indicates the window 220 before the shield-printed layer 520, and a reference numeral 440 indicates the window 220 after the shield-printed layer 520 is formed.

Specific regions 226 and 227 of the window 220, corresponding to the optical sensor module 202 and 203, may be shield-printed if the electronic device 200 has, on the backside thereof, the optical sensor module 202 and 203 and the window 220 that covers the optical sensor module 202 and 203. For example, among regions 225, 226 and 227 of the window 220 that are not printed with an opaque material, some regions 226 and 227, corresponding to the optical sensor module 202 and 203, using light in the IR wavelength band, may be shield-printed with a material having a low transmissivity for light in the visible wavelength band and a high transmissivity for light in the IR wavelength band. This material may include a coloring material that has a dye composition (or, a dye composition and a pigment composition). In this case, the shield printing may be performed in the same color as the BM region 230 adjacent to the above regions 226 and 227.

Among the regions 225, 226 and 227 of the window 220, the region 225, corresponding to the camera module 191 that mainly use the optical characteristics of the visible wavelength band, may be not shield-printed.

When the shield-printed layer 520 is formed on the regions 226 and 227 of the window 220 corresponding to the optical sensor module 202 and 203, as indicated by the reference numeral 440, these regions 226 and 227 may be integrated in color into an adjacent window area while preventing the internal components from being visible from the outside. This may provide a beautiful appearance of the electronic device 200. Additionally, when the shield-printed layer 520 is formed using a coloring material containing a dye composition (or, a dye composition and a pigment composition), the above regions 226 and 227 may be printed with the same material at one time. This may provide an esthetic consistency in the outward appearance of the electronic device 200 and also reduce a manufacturing cost in of the electronic device 200.

Figure 5A:
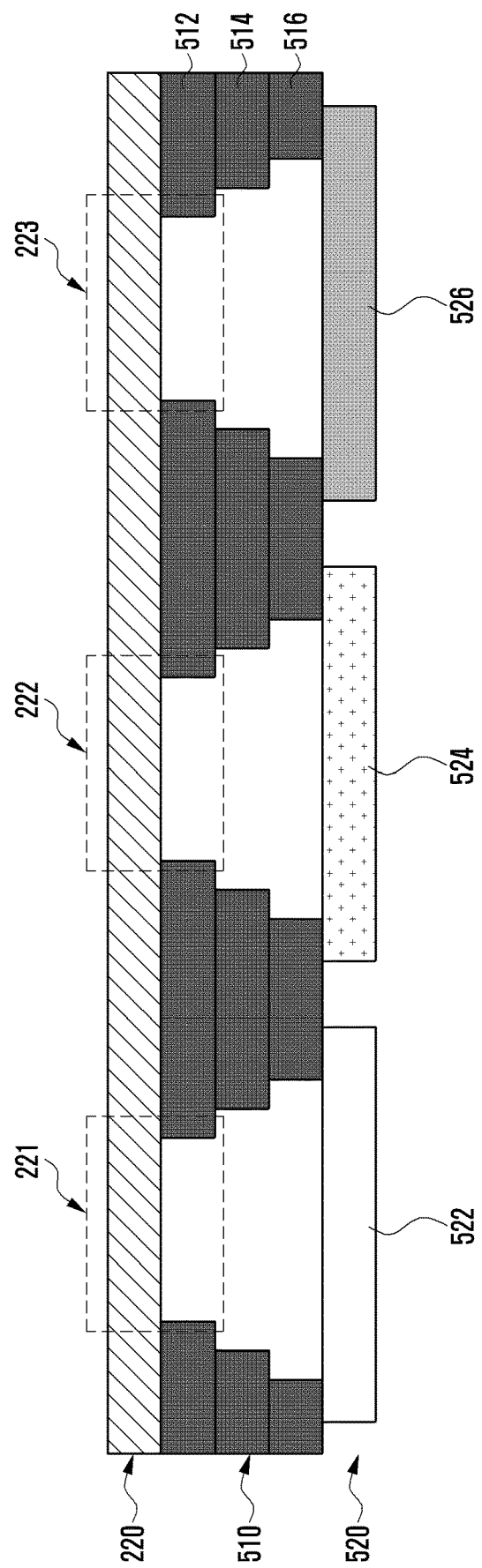

FIGS. 5A and 5B are diagrams of the window including an opaque printed layer and the shield-printed layer, according to an embodiment of the present disclosure.

FIG. 5A is a diagram of the window 220 on which the shield-printed layer 520 is formed using a conventional pigment type coloring material.

In the electronic device 200, the opaque printed layer 510 may be formed on the non-display area 320 of the window 220 except some regions 221, 222 and 223 (i.e., 223*a* and 223*b*) of the non-display area 320. For example, the regions of the window 220 where the opaque printed layer 510 is not formed may be locations corresponding to the camera module 191 and/or device components using the sensor light or the LED light. The other region of the window 220 where the opaque printed layer 510 is formed may be referred to as the BM region.

The opaque printed layer 510 may include a first printed layer 512, a second printed layer 514, and a third printed layer 516. The first printed layer 512 may be formed by a background printing using a first ink. The second printed layer 514 may be formed on at least a part of the first printed layer 512 by a shield printing using a second ink. The third printed layer 516 may be formed on at least a part of the second printed layer 514 by an adhesion-enhancement printing using a third ink. The first ink and the second ink may be the same material.

After the opaque printed layer 510 is formed on the window 220, the shield-printed layer 520 may be formed on at least a part of the regions 221, 222 and 223, through which the sensor light or the LED light may be transmitted. Although the shield-printed layer 520 is illustrated herein as being formed under the opaque printed layer 510, the shield-printed layer may also be coated on the window 220 like the first printed layer 512.

In the electronic device 200 including the LED module 201 and/or the optical sensor module 202 and 203, the printing process may be performed by the number of modules, using a coloring material suitable for the optical characteristics of the respective modules to effectively shield the regions of the window 220 corresponding to the respective modules. The color used for printing may be changed according to the type of the wavelength band of light outputted from or inputted to the module, so that the printing process may be performed repeatedly by the wavelength band of light.

In the electronic device 200, including the LED module 201, the proximity/illuminance IR sensor, and the iris sensor, different materials are used for forming the shield-printed layer 520. Namely, as shown in FIG. 5A, a first shield-printed layer 522 is formed using a first coloring material so as to shield the window region 221 corresponding to the LED module 201, a second shield-printed layer 524 is formed using a second coloring material so as to shield the window region 222 corresponding the proximity/illuminance IR sensor, and a third shield-printed layer 526 is formed using a third coloring material so as to shield the window region 223 corresponding to the iris sensor.

FIG. 5B is a diagram of the window 220 on which the shield-printed layer 520 is formed using a coloring material containing a dye composition and/or a pigment composition, according to an embodiment of the present disclosure.

The opaque printed layer 510 may be formed on the non-display area 320 of the window 220, except for some regions 221, 222 and 223 of the non-display area 320. In addition, after the opaque printed layer 510 is formed, the shield-printed layer 520 may be formed on at least a part of the regions 221, 222 and 223, through which the sensor light or the LED light may be transmitted. The coloring material used for forming the shield-printed layer 520 may contain a pigment composition or a dye composition. The coloring material containing the pigment composition may be in the form of a liquid material mixed with pigment grains.

In the coloring material containing the pigment composition, the diffused reflection due to the pigment grains is increased as the content of the pigment grains is higher, thus the light transmissivity is lowered in the visible wavelength band. The diffused reflection due to the pigment grains occurs in the IR wavelength band as well as in the visible wavelength band. Therefore, if the light transmissivity of the visible wavelength band is lowered by using only the pigment composition, the light transmissivity may also be lowered in the IR wavelength band (e.g., 810 nm, 940 nm) for guaranteeing the sensor performance. In addition, if the optical sensor module 202 and 203 is shielded using only the pigment composition, the content of the pigment grains may not be increased more than a certain level in order to prevent deterioration of the sensor performance. Therefore, it is not possible to effectively shield the optical sensor module 202 and 203 in the visible wavelength band (e.g., 550 nm).

Even with grains like the pigment composition, the dye composition may give a coloring effect by absorbing light of a specific wavelength band. Since the dye composition does not cause the diffused reflection by grains, the use of the coloring material containing the dye composition may ensure an appropriate level of light transmissivity in the IR wavelength band, even if the transmissivity in the visible wavelength band is lowered. Therefore, in a case of using the coloring material containing the dye composition, the optical sensor module may effectively be shielded in the visible wavelength band without deteriorating the sensor performance.

The coloring material may contain both the dye composition and the pigment composition.

The dye composition may adjust the transmissivity in the visible wavelength band by regulating the concentration of the dye composition. However, since the dye composition has a lower mechanical strength and a lower long-term reliability than the pigment composition, the printed layer formed using the coloring material containing the dye composition may peel off or cause discoloration in a high temperature or high humidity environment.

Containing both the dye composition and the pigment composition, the coloring material used in the electronic device 200 may effectively conceal the sensor module without degrading the sensor performance, and also satisfy conditions of mechanical strength and long-term reliability.

As shown in FIG. 5B, first, second and third shield-printed layers 528 of the shield-printed layer 520 for shielding a plurality of modules may all be formed using the same coloring material.

The mixing (weight) ratio of the pigment composition to the dye composition in the coloring material used to form the shield-printed layer 520 may be determined according to the specification of each composition. For example, the mixing ratio of the pigment composition to the dye composition in the coloring material may be 3:1, or it may range from 8:2 to 7:3.

In a process of forming the shield-printed layer 520 as shown in FIG. 5B, the mechanical strength and long-term reliability of the coloring material containing the dye composition may be improved by changing an annealing condition for drying after coating the coloring material. For example, by changing the annealing condition from drying at 80☐ for 30 minutes to 150☐ for 30 minutes, the durability of the shield-printed layer 520 may be improved.

Figure 6:
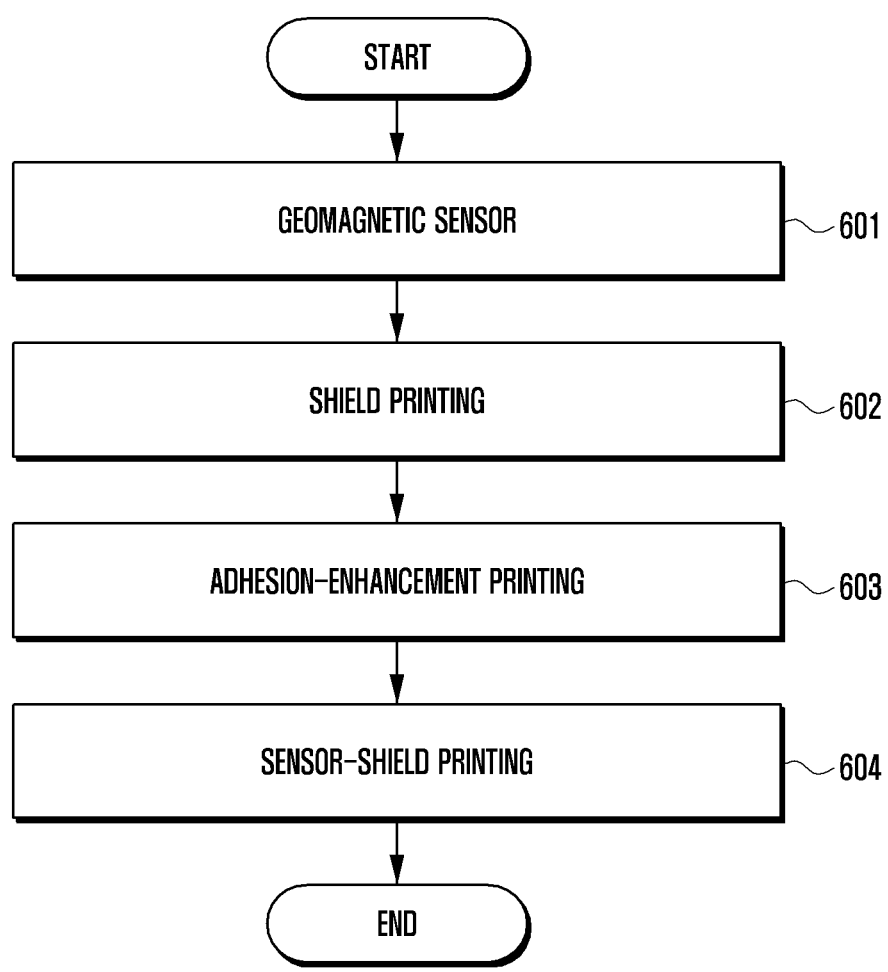
FIG. 6 is a flow diagram of a method for forming the printed layers, according to an embodiment of the present disclosure.

FIG. 6 is a flow diagram of a method for forming the printed layers, according to an embodiment of the present disclosure.

As shown in FIG. 6, on the window 220 equipped in the electronic device 200, the opaque printed layer 510 and the shield-printed layer 520 may be formed through a four-step printing operation.

The opaque printed layer 510 and the shield-printed layer 520 may be formed on the lower surface of the window 220 when the lower surface of the window 220 faces the display 160 and the optical sensor module 202 and 203.

At step 601, a base printing may be performed by coating a first ink on at least a part of the non-display area 320 of the window 220. Here, the non-display area 320 refers to an area other than the display area 310 through which an image displayed on the display 160 is transmitted.

Next, at step 602, a shield printing may be performed by coating a second ink on at least a part of the area coated with the first ink for the base printing. The second ink may be the same material as the first ink used for the base printing.

Next, at step 603, an adhesion-enhancement printing may be performed by coating a third ink on at least a part of the area coated with the second ink for the shield printing. Through steps 601 to 603, the opaque printed layer 510 may be formed on the lower surface of the window 220.

Next, at step 604, a sensor-shield printing, such as printing for shielding the sensor module, may be performed by coating a fourth ink on at least a part of the remaining area of the non-display area 320 where the opaque printed layer 510 is not formed.

The area coated with the fourth ink may include a region for transmitting the sensor light from the optical sensor module 202 and 203 and/or a region for transmitting the LED light from the LED module 201. The fourth ink may be a coloring material containing a dye composition, or it may be a coloring material containing both a dye composition and a pigment composition.

The fourth ink used for the sensor-shield printing may have the same color as the second ink used for the shield printing on the non-display area.

When the coloring material containing the dye composition is used, the shield-printed layer 520 for shielding the optical sensor module 202 and 203 and the LED module 201 may be formed through a single printing process.

Although the above-described method performs the operation of forming the shield-printed layer 520 after the operation of forming the opaque printed layer 510, the shield-printed layer 520 may alternatively be formed before the opaque printed layer 510 is formed.

A method for manufacturing the window of the electronic device including the display, the optical sensor module having the first and second optical sensors, and the window covering both the optical sensor module and the display may include performing a base printing by coating a first ink on at least a part of a non-display area of the window, wherein the non-display area is an area disallowing transmission of an image displayed on the display; performing a shield printing by coating a second ink on at least a part of the non-display area coated with the first ink for the base printing; performing an adhesion-enhancement printing by coating a third ink on at least a part of the non-display area coated with the second ink for the shield printing; and performing a sensor-shield printing by coating a fourth ink on a first region and a second region of the non-display area, wherein the first region is a region for transmitting a sensor light from the first optical sensor and the second region is a region for transmitting a sensor light from the second optical sensor. The non-display area coated with the first ink may correspond to at least a part of a remaining area other than the first and second regions.

The fourth ink may contain a dye composition. The shield-printed layer formed through the sensor-shield printing may have a transmissivity of 80% or more in a 810 nm wavelength band and a 940 nm wavelength band, and a transmissivity of about 7% in a 550 nm wavelength band.

Figure 7:
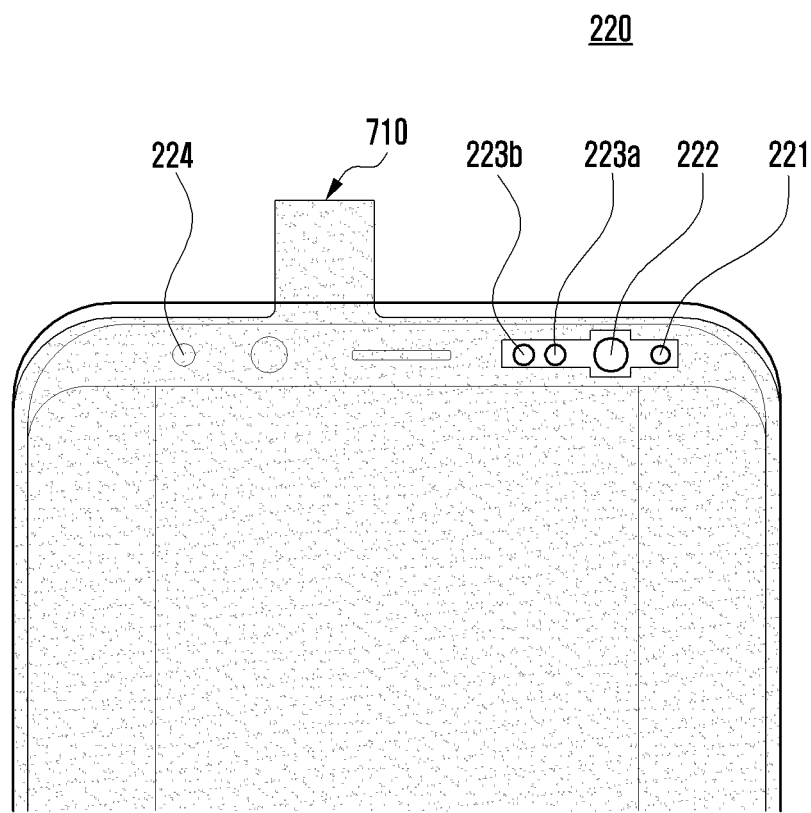
FIG. 7 is a diagram of a film attached to a lower surface of the window in the electronic device, according to an embodiment of the present disclosure.

FIG. 7 is a diagram of a film attached to a lower surface of the window in the electronic device according to various embodiments of the present disclosure. The electronic device 200 may use the coloring material containing the dye composition in order to form the shield-printed layer 520 on at least a part of the lower surface of the window 220.

After the shield-printed layer 520 is formed, a process protective film 710 may be attached to the window 220 in order to prevent damage which may occur in a subsequent process. The process protective film 710 may include an optical clear adhesive (OCA) layer for adhering the film to the window. However, in case of the shield-printed layer 520 formed of the coloring material containing the dye composition, an undesirable ink transfer by the dye component of the shield-printed layer 520 may occur in the OCA layer adjacent to the shield-printed layer 520.

As shown in FIG. 7, the process protective film 710 used in a manufacturing process of the electronic device 200 may not include the OCA layer with regard to at least some regions 221, 222, 223a and 223b, corresponding to the shield-printed layer 520, thus preventing an ink transfer.

The process protective film 710 may have some openings that coincide with the at least some regions 221, 222, 223a and 223b, corresponding to the shield-printed layer 520 in order to prevent the ink transfer phenomenon.

The process protective film 710 may have another protective film (i.e., a second protective film) in the openings.

Figure 8A:
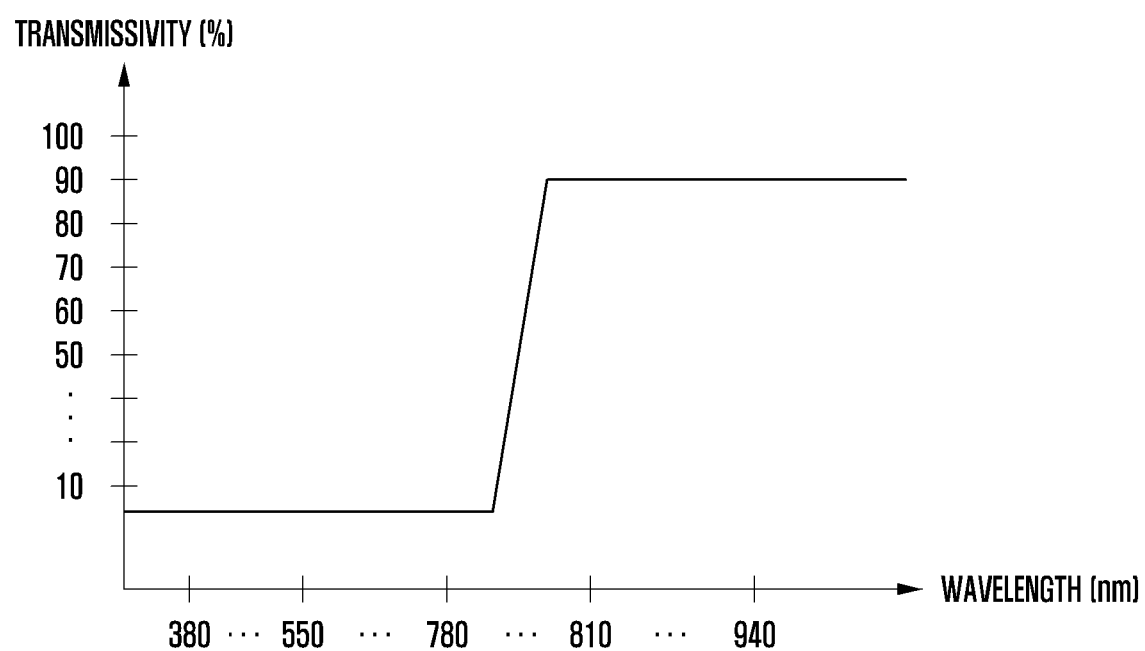
FIGS. 8A to 8C are graphs illustrating the transmissivity characteristics of a coloring material used to form the shield-printed layer on the window, according to an embodiment of the present disclosure.
Figure 8B:
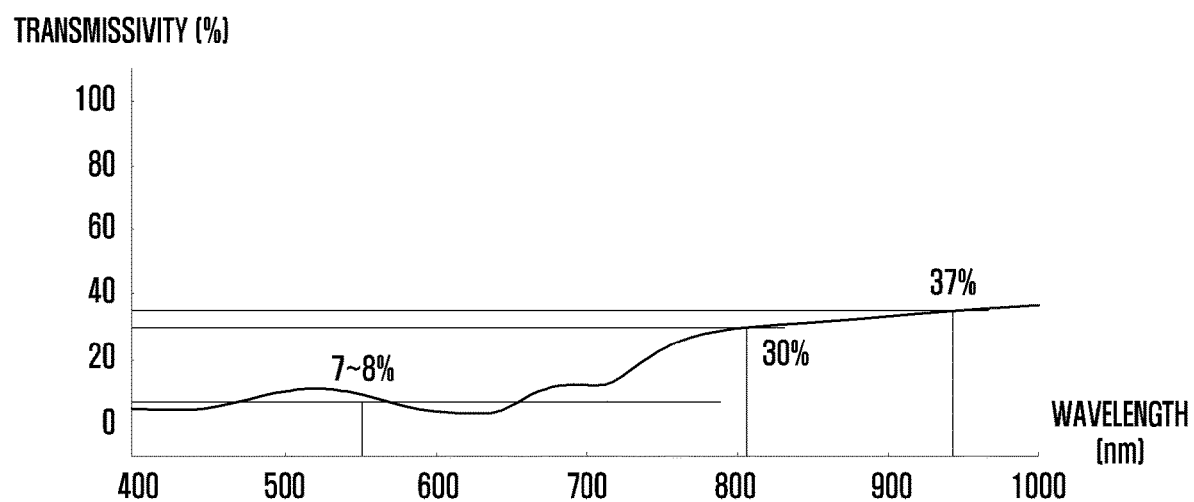
Figure 8C:
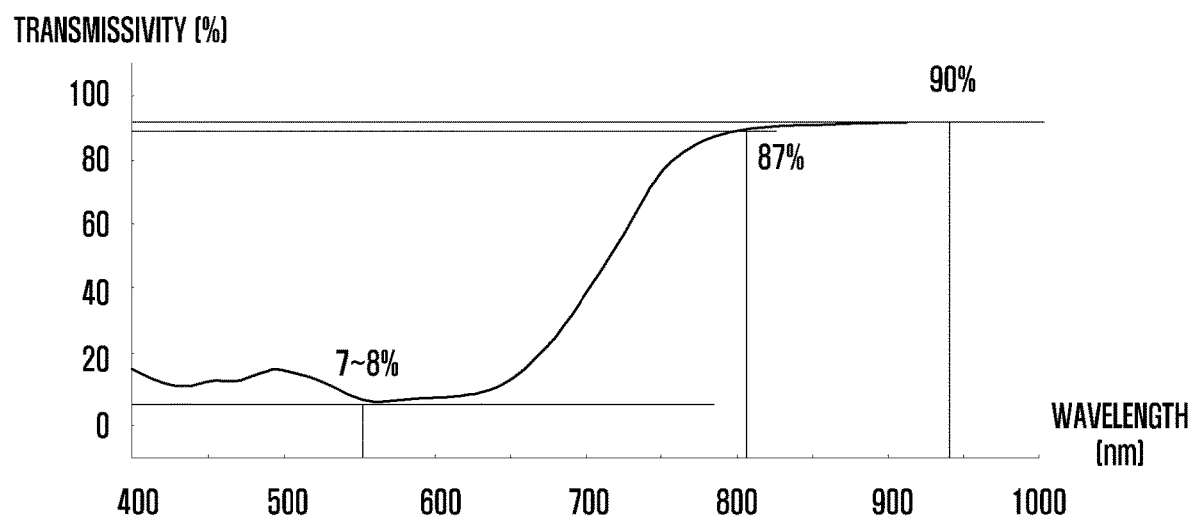

FIGS. 8A to 8C are graphs illustrating the transmissivity characteristics of a coloring material used to form the shield-printed layer on the window, according to an embodiment of the present disclosure.

FIG. 8A is a graph showing a variation in transmissivity of the shield-printed layer 520 according to wavelength bands.

The coloring material used for forming the shield-printed layer 520 may have a high transmissivity for light in the IR wavelength band and a low transmissivity for light in the visible wavelength band.

The shield-printed layer 520 may be formed using a coloring material that shields different kinds of modules (e.g., the LED module 201 and/or the optical sensor module 202 and 203), and also has a high transmissivity in wavelength bands of light outputted from or inputted to respective modules. For example, the coloring material may contain a dye composition (or, a dye composition and a pigment composition).

Since the shield-printed layer 520 is formed so that the user cannot see the device components disposed inside the window 220 of the electronic device 200, the coloring material used for the shield-printed layer 520 should have a low transmissivity in the visible wavelength band (e.g., 380 nm to 780 nm) that can be recognized by a human being. For example, if the transmissivity of the shield-printed layer 520 is 10% or less in the wavelength band of 550 nm, the user can feel a sense of unity of design between the shield-printed layer 520 and regions adjacent thereto.

TABLE 1

|  | LED module | Iris sensor | proximity/illuminance IR sensor |
|---|---|---|---|
| 550 nm | 7% ± 2% | 7% ± 2% | 7% ± 2% |
| 810 nm | — | 84% ± 4% | — |
| 940 nm | — | — | 85% ± 5% |

Table 1 shows conditions of transmissivity by wavelength bands according to the type of device components.

A window region corresponding to the iris sensor, or an iris IR LED capable of operating in connection with the iris sensor, may require transmissivity of 84% or more, with an error range of 4%, at 810 nm, which is the wavelength band of the sensor light used for iris recognition, such that the sensor light can be transmitted through the window region without distortion of optical characteristics. A window region corresponding to the proximity/illuminance IR sensor may require transmissivity of 85% or more, with an error range of 5%, at 940 nm, which is the wavelength band of the sensor light used for proximity sensing, such that the sensor light can be transmitted through the window region.

The LED module 201 indicates the driving state of the electronic device 200 by, for example, red, green, yellow or blue. Therefore, when the LED module 201 outputs an LED light, the characteristics of the outputted light may not be distorted by the window region. In addition, the respective window regions corresponding to the LED module 201 and the plurality of sensors 202 and 203 may be shielded so as to provide the esthetic consistency between the window region and the adjacent BM region. In order to satisfy such conditions, the respective window regions corresponding to the LED module, the iris sensor, and the proximity/illuminance IR sensor may require transmissivity of about 7%, with an error range of 4%, at 550 nm which is the visible wavelength band.

When the shield-printed layer 520 is formed using the coloring material containing both the dye composition and the pigment composition, all the conditions shown in Table 1 may be satisfied.

The shield-printed layer 520 of the present disclosure may have a transmissivity of 80% or more in the 810 nm and 940 nm wavelength bands, respectively, and a transmissivity of 7% in the 550 nm wavelength band.

FIG. 8B is a graph showing the transmissivity of the window region where the shield-printed layer 520 is formed using the conventional coloring material containing the pigment composition, and FIG. 8C is a graph showing the transmissivity of the window region where the shield-printed layer 520 is formed using the coloring material containing the dye composition (or, a dye composition and a pigment composition).

As shown in FIG. 8B, if the shield-printed layer 520 is formed by using the conventional coloring material containing the pigment composition so as to have a transmissivity of about 7% in the visible wavelength band (e.g., 550 nm), in accordance with the conditions shown in Table 1, the transmissivity in the IR wavelength band (e.g., 810 nm or 940 nm) is less than 40% due to the characteristics of the pigment composition and therefore fails to satisfy the conditions in Table 1.

As shown in FIG. 8C, the shield-printed layer 520 formed using the coloring material containing the dye composition (or, a dye composition and a pigment composition) composition satisfies both the transmissivity condition in the visible wavelength band (e.g., 550 nm) and the transmissivity condition in the IR wavelength band (e.g., 810 nm and 940 nm), which are defined in Table 1.

Since all the transmissivity conditions required for the LED module 201 and the plurality of sensors 202 and 203 are satisfied, as shown in the graph of FIG. 8C, when the shield-printed layer 520 is formed using the same coloring material containing the dye composition (or, a dye composition and a pigment composition), it is possible to improve the esthetic consistency of the electronic device 200 and to reduce manufacturing costs by omitting some of the process steps without lowering the performance of the device components (i.e., the LED module 201 and the sensors 202 and 203).

According to various embodiments, the electronic device includes a housing including a first plate and a second plate, the first plate facing a first direction and being substantially transparent, the second plate facing a second direction opposite to the first direction, and the first plate having an outer surface facing the first direction and an inner surface facing the second direction; a display disposed inside the housing and exposed to an outside through a portion of the first plate; a first opaque layer formed using a first material, attached directly or indirectly to the inner surface of the first plate without covering the display as viewed from the first direction, and including a first opening, a second opening, a first portion that fills at least a part of the first opening, and a second portion that fills at least a part of the second opening; a first optical element facing the first portion and disposed inside the housing between the first portion and the second plate; and a second optical element facing the second portion and disposed inside the housing between the second portion and the second plate. The first and second portions may be formed using a second material different from the first material. The second material may contain a dye composition which is soluble in an organic or inorganic solvent.

The first optical element may include a light emitting diode (LED), and the second optical element may include an IR sensor.

The first opaque layer may further include a third opening and a third portion that fills at least a part of the third opening. The third portion may be formed using the second material.

The second material may be obtained by mixing at least one of a dye composition and a pigment composition with at least one material selected from the group consisting of a spin-on glass, an acrylic resin, a polymer resin, and an epoxy resin.

The electronic device may further include a third optical element. The second optical element may include a proximity sensor, and the third optical element may include an iris sensor or an iris IR LED capable of operating in connection with the iris sensor.

The second material may contain a pigment composition and a dye composition, and a weight ratio of the pigment composition to the dye composition may range from 8:2 to 7:3. The second material may include a coloring material capable of implementing the same color as the first material.

The coloring material used for the shield-printed layer may be obtained by mixing at least one of a dye composition and a pigment composition with at least one material selected from the group consisting of a spin-on glass, an acrylic resin, a polymer resin, and an epoxy resin. For example, the coloring material may be composed of a material obtained by mixing at least two dyes of blue, green and red into at least one material selected from the group consisting of a spin-on glass, an acrylic resin, a polymer resin, and an epoxy resin.

The term "module" used in the present disclosure may refer to a unit including one or more combinations of hardware, software, and firmware. The "module" may be used interchangeably with terms such as "unit," "logic," "logical block," "component," or "circuit". The "module" may be a minimum unit of a component formed as one body or part thereof. The "module" may be a minimum unit for performing one or more functions or a part thereof. The "module" may be implemented mechanically or electronically and may include at least one of an application-specific IC (ASIC) chip, a field-programmable gate array (FPGA), and a programmable-logic device for performing certain operations which have been known or are to be developed in the future.

Examples of computer-readable media include: magnetic media, such as hard disks, floppy disks, and magnetic tape; optical media such as compact disc ROM (CD-ROM) and DVD; magneto-optical media, such as floptical disks; and hardware devices that are specially configured to store and perform program instructions, such as programming modules, including ROM, RAM, and flash memory. Examples of program instructions include machine code instructions created by assembly languages, such as a compiler, and code instructions created by a high-level programming language executable in computers using an interpreter. The described hardware devices may be configured to act as one or more software modules in order to perform the operations and methods described above, or vice versa.

Modules or programming modules according to embodiments of the present disclosure may include one or more components, remove part of them, or include new components. The operations performed by modules, programming modules, or the other components, may be executed in serial, parallel, repetitive or heuristic fashion. Part of the operations can be executed in any other order, skipped, or executed with additional operations.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. An electronic device comprising:
   an optical sensor module including a first optical sensor and a second optical sensor;
   a window covering the optical sensor module;
   a first shield-printed layer printed in a first region for transmitting a sensor light from the first optical sensor on a lower surface of the window facing the optical sensor module; and
   a second shield-printed layer printed in a second region for transmitting a sensor light from the second optical sensor on the lower surface of the window,
   wherein the first and second shield-printed layers are printed using a same coloring material, and
   wherein a third region corresponding to a camera module is not shield printed using the same coloring material.

2. The electronic device of claim 1, wherein the coloring material contains a dye composition.

3. The electronic device of claim 2, wherein each of the first and second shield-printed layers has a transmissivity of 80% or more in each of 810 nm and 940 nm wavelength bands.

4. The electronic device of claim 1, further comprising:
   a display disposed to face the lower surface of the window; and
   an opaque printed layer printed in at least a part of a non-display area of the window, the non-display area being an area other than a display area through which an image displayed on the display is transmitted,
   wherein the coloring material used for printing the first and second shield-printed layers has a same color as the opaque printed layer.

5. The electronic device of claim 1, wherein the first optical sensor and the second optical sensor are a proximity/illuminance sensor and an iris sensor, respectively.

6. An electronic device comprising:
   an optical sensor module including a first optical sensor and a second optical sensor;
   a light emitting diode (LED) module disposed near the optical sensor module;
   a window covering both the optical sensor module and the LED module;
   a first shield-printed layer printed in a first region for transmitting a sensor light from the first optical sensor on a lower surface of the window facing both the optical sensor module and the LED module;
   a second shield-printed layer printed in a second region for transmitting a sensor light from the second optical sensor on the lower surface of the window; and
   a third shield-printed layer printed in a third region for transmitting an LED light from the LED module on the lower surface of the window,
   wherein the first, second and third shield-printed layers are printed using a same coloring material.

7. The electronic device of claim 6, wherein the coloring material contains a dye composition.

8. The electronic device of claim 7, wherein each of the first, second and third shield-printed layers has a transmissivity of 80% or more in each of 810 nm and 940 nm wavelength bands.

9. The electronic device of claim 8, wherein each of the first, second and third shield-printed layers has a transmissivity of about 7% in a 550 nm wavelength band.

10. The electronic device of claim 6, further comprising:
    a display disposed to face the lower surface of the window; and
    an opaque printed layer printed in at least a part of a non-display area of the window, the non-display area being an area other than a display area through which an image displayed on the display is transmitted, wherein the coloring material used for printing the first, second and third shield-printed layers has a same color as the opaque printed layer.

11. The electronic device of claim 6, wherein the first optical sensor and the second optical sensor are a proximity/illuminance sensor and an iris sensor, respectively.

\* \* \* \* \*